Dec. 25, 1951 R. RICHARDSON 2,579,862
HEDGE CUTTING MACHINE
Filed Sept. 2, 1948 4 Sheets-Sheet 1
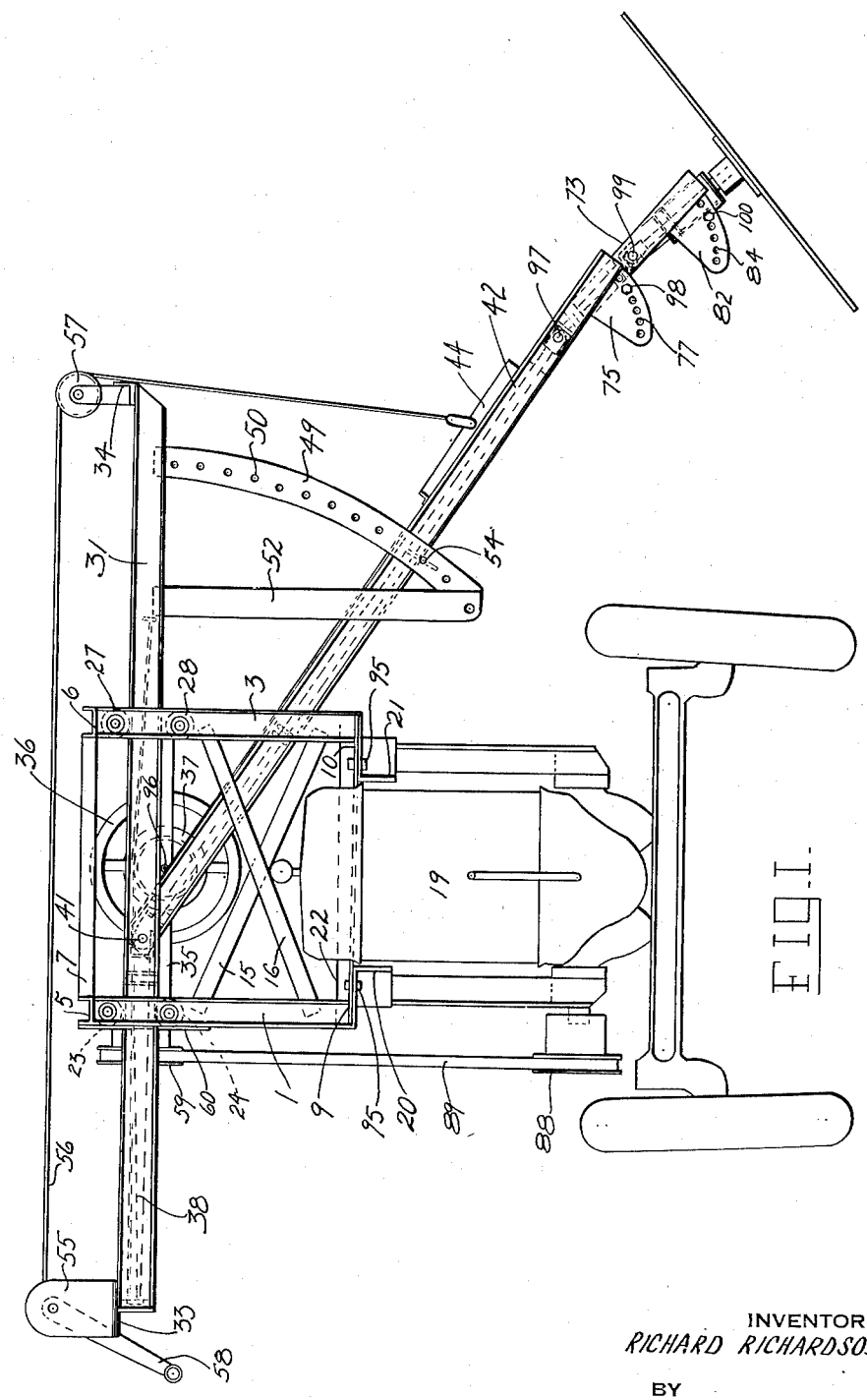
INVENTOR:
RICHARD RICHARDSON
BY
Richardson, David and Nordon
ATTORNEYS Dec. 25, 1951
R. RICHARDSON
2,579,862
HEDGE CUTTING MACHINE
Filed Sept. 2, 1948
4 Sheets-Sheet 2
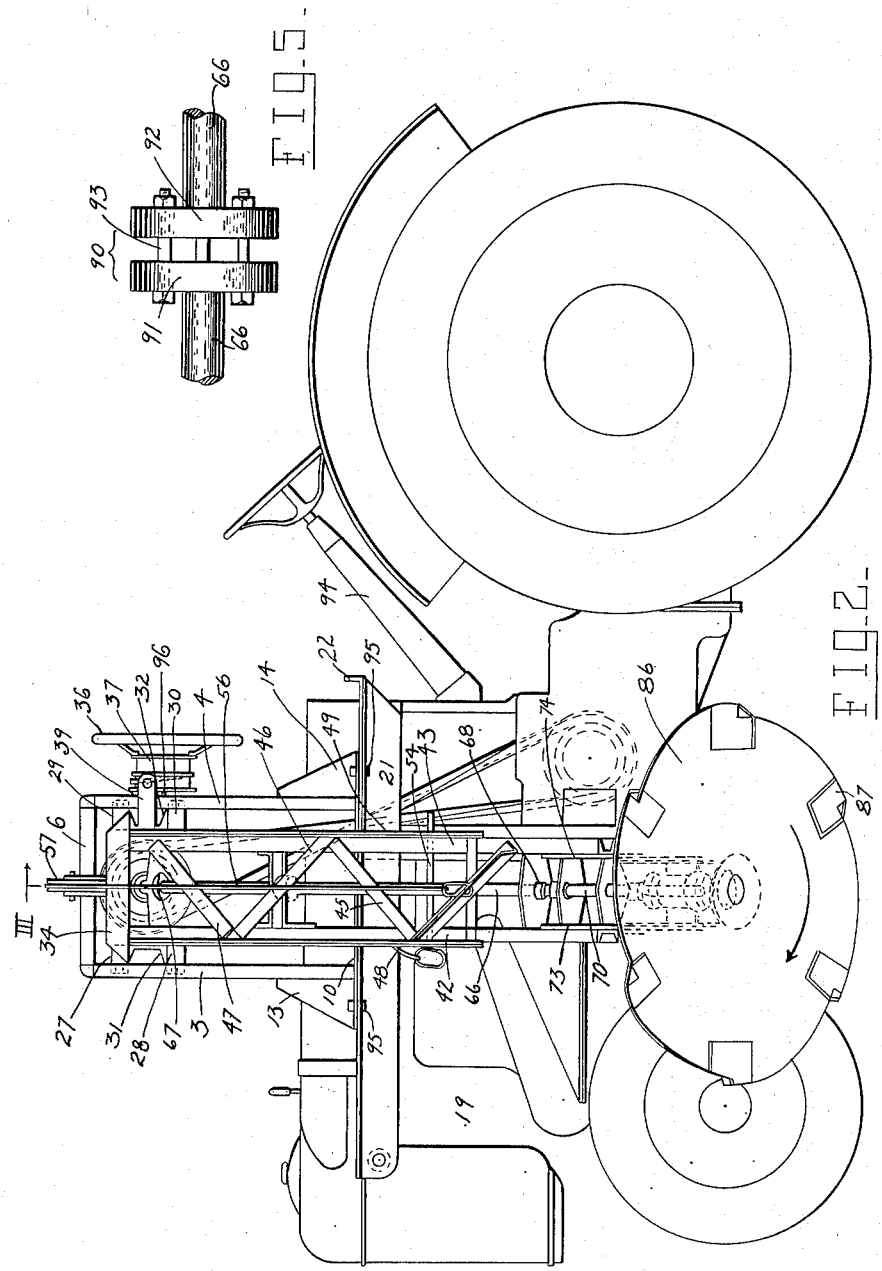
INVENTOR:
RICHARD RICHARDSON
BY
Richardson, David and Norton
ATTORNEYS Dec. 25, 1951   R. RICHARDSON   2,579,862
HEDGE CUTTING MACHINE
Filed Sept. 2, 1948   4 Sheets-Sheet 3
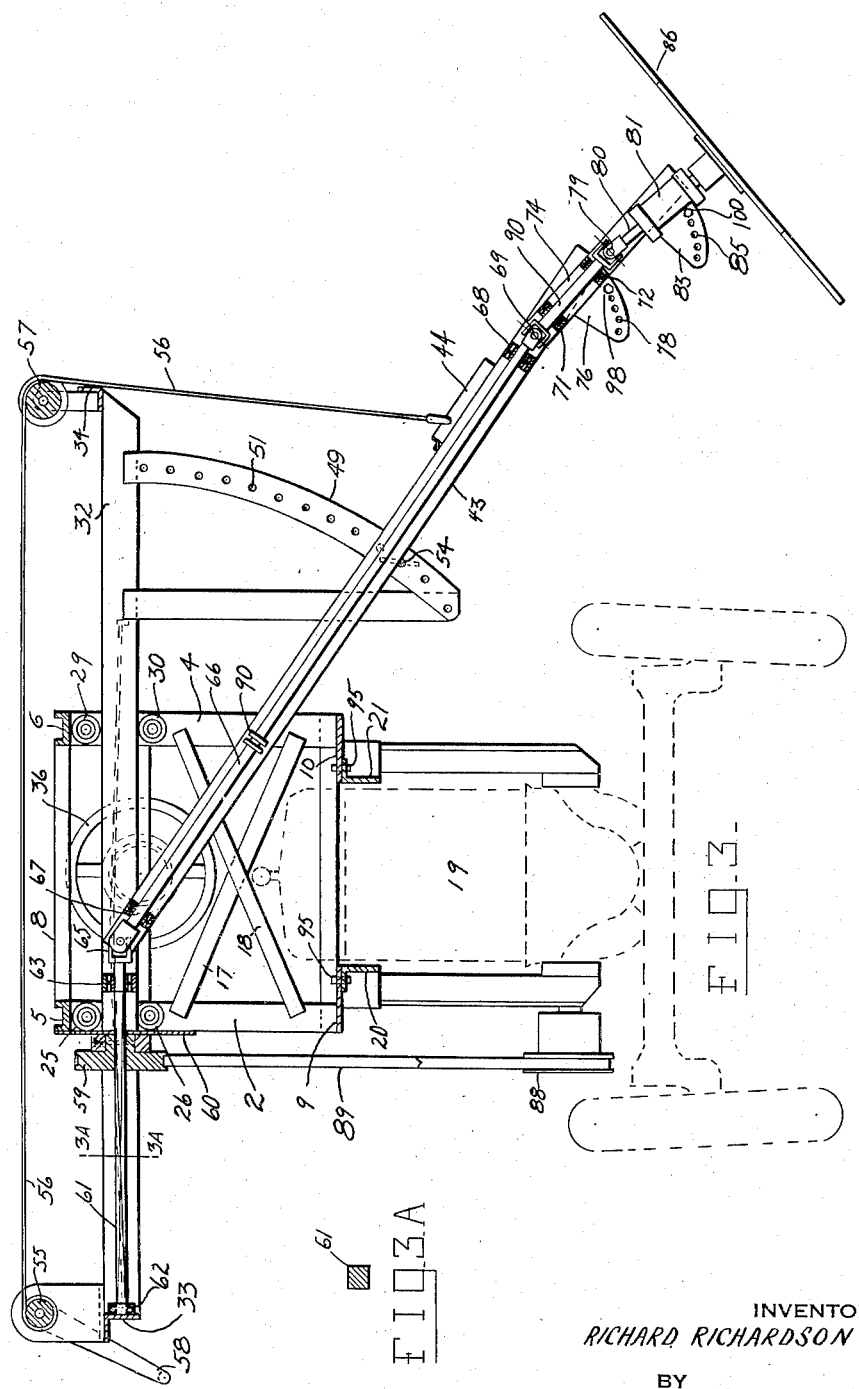
INVENTOR:
RICHARD RICHARDSON
BY
Richardson, David and Nordon
ATTORNEYS

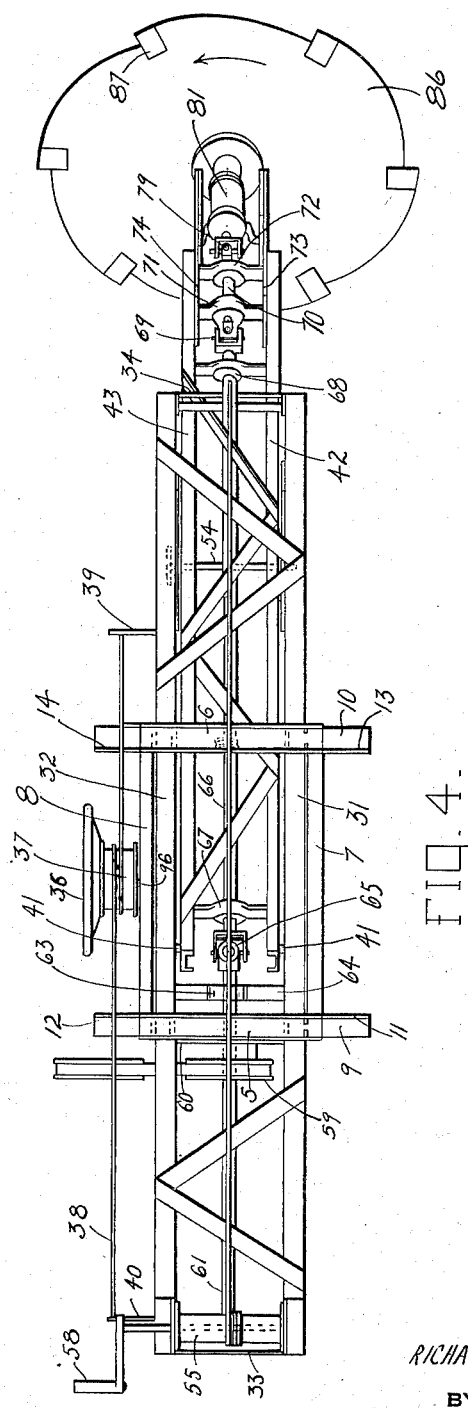

Patented Dec. 25, 1951

2,579,862

UNITED STATES PATENT OFFICE 2,579,862

HEDGE CUTTING MACHINE

Richard Richardson, Coniston, near Hull, England

Application September 2, 1948, Serial No. 47,439
In Great Britain September 16, 1947

9 Claims. (Cl. 56—25.4)

This invention relates to hedge cutting machines.

The primary object of the present invention is to provide a power driven hedge cutting machine which is efficient in use and of robust construction.

The hedge cutting machine according to the present invention has a rotatable toothed cutting tool which is mounted for angular adjustment and also for translational movement on a tractor or other power driven vehicle and is connected to be rotated from a power take off of the engine.

More particularly the apparatus, according to the present invention, comprises a support capable of being mounted on a tractor or other power driven vehicle, a member mounted for lateral displacement with respect to such support under manual control, an arm pivoted to such displaceable member for adjustment into a plurality of possible angular positions, a drive shaft on the displaceable member connected through a universal coupling to a drive shaft on the arm, a final drive shaft connected through a universal coupling to the free end of the shaft on the arm and mounted for controlled angular displacement, and means of taking a power drive to the drive shaft of the laterally displaceable member in such manner as to permit displacement thereof without interrupting the drive; a rotary cutting tool being made fast to the free end of the final drive shaft or to an extension thereof.

According to a further feature of the invention, the free end of the final drive shaft is connected through a universal coupling to an auxiliary drive shaft in a mounting capable of controlled angular displacement with respect to the final drive shaft mounting when the cutting tool is made fast to the end of the auxiliary shaft, as in this way the range of inclination which may be given to the plane of the cutting tool is extended.

Preferably the final drive shaft, and similarly the auxiliary drive shaft when the same is provided, is carried by a mounting capable of angular displacement with respect to a pair of plates or equivalent members having registering arcuate rows of holes in which an element or elements is or are placed to hold the mounting in a desired angular position.

According to yet another feature of the invention the displacement of the laterally displaceable member is controlled by a single hand wheel driving a drum around which passes a cable or the equivalent the ends of which are attached at, or near, the ends of the displaceable member.

It is furthermore preferred to mount the pivoted arm to move between and with respect to a pair of arcuate members having registering holes therein in which may engage an element or elements to hold such pivoted arm in a desired angular position and to facilitate the elevation of the pivoted arm the apparatus is, in accordance with yet another feature of the invention, provided with a winch at one end of the displaceable member with the cable thereof passing over a pulley at the other end of that member to engage the pivoted arm. The handle for operating the winch is desirably detachable and only in position when required to displace the pivoted arm.

The power drive is taken direct as by an endless belt, or through suitable gearing or shafting, to a pulley mounted so as to be incapable of lateral displacement with respect to the support when the drive shaft on the displaceable member is square, splined or otherwise made fast to such pulley so as to rotate therewith yet be capable of axial displacement relative thereto.

The cutting tool is conveniently in the form of a disc having a plurality, say three or four or even more, radially extending teeth of short extent relative to the diameter of the disc. It is intended that the cutting tool be rotated at some seven to eight hundred revolutions per minute and that it be presented to the hedge to be cut at a slight lead angle when the shape of the sides and top of the hedge is determined by the angular setting of the final drive shaft or the auxiliary drive shaft in varying the angle of the plane in which the disc rotates between vertical to substantially horizontal.

The apparatus is primarily intended to be mounted with the tractor or other vehicle by being superimposed thereon, conveniently on a suitable frame-work built on to the tractor above the engine.

The operator sits, or stands, immediately behind the apparatus and by means of the hand wheel provided moves the displaceable member back and forth as may be required to keep the cutting tool working on the hedge in spite of variations in the direction of movement of the tractor or equivalent vehicle. Before starting to work, the angle of the swinging arm and of the final drive shaft, and also that of the auxiliary shaft when same is provided, is set to cut the hedge in a desired plane, and the tractor or other vehicle is then driven along beside the hedge. Hedges may thus be quickly and accurately cut to desired extents and desired shapes.

In order that the invention may be clearly understood and readily carried into effect an embodiment designed to be superimposed on a tractor is by way of example hereinafter more fully described with reference to the accompanying drawings which are given for purposes of illustration only and not of limitation.

In these drawings:

Figure 1 is a front elevation of the hedge cutting machine shown mounted on a conventional agricultural tractor, Figure 2 is a side elevation as seen from the right hand side of Figure 1, Figure 3 is a transverse section taken on the line III—III of Figure 2 showing the power transmission to the cutter, Figure 3A is an enlarged cross-sectional view of the square shaft, taken on line 3A—3A in Fig. 3.

Figure 4 is a plan view of the hedge cutting machine shown detached from the tractor, and Figure 5 is a detail view of the break shaft arrangement in the drive shaft.

Referring now to the said drawings the hedge cutting machine consists of a support comprising four corner upright members 1, 2, 3, 4 which are interconnected at the top by fore-and-aft members 5, 6 and by transverse members 7, 8 while the members 1, 2, and 3, 4 are respectively interconnected at the bottom by members 9, 10, to which they are additionally secured by angle brackets 11, 12, 13, 14, to form a rigid rectangular framework which is braced by crossed-members 15, 16 at the front and by similar crossed members 17, 18 at the rear. This support is mounted on the tractor 19 preferably in a detachable manner on a framework built onto the tractor chassis so as not to interfere with its normal use and conveniently comprising side members 20, 21 which are braced by a rear transverse member 22 and on which the bottom side members 9, 10 of the support seat to be made fast thereto as by bolts 95.

Each upright member 1, 2, 3, 4 carries a pair of superimposed rollers freely rotatable on horizontal axes, i. e. rollers 23, 24 on the member 1, rollers 25, 26 on the member 2, rollers 27, 28 on the member 3 and rollers 29, 30 on the member 4 of which the pair of rollers 23, 24 face inwards toward the pair of rollers 25, 26 and the pair of rollers 27, 28 similarly face the pair of rollers 29, 30. These pairs of rollers form carriers and guides for a laterally displaceable slidable member comprising a pair of girders 31, 32 which are interconnected at their ends by members 33, 34 and also desirably braced intermediate their length.

A transverse member 35 which extends across between the upright members 2, 4 carries a horizontally extending stub shaft 96 on which is rotatably mounted a hand wheel 36 which is fast with a drum 37 about which passes one or more turns of a cable 38, or the equivalent, the ends of which are attached to outstanding brackets 39, 40 on the girder 32 of the slidable member. By means of this hand wheel 36 the slidable member may be slid back and forth with respect to the support.

To the girders 31, 32 forming the slidable member is pivoted at 41 an arm, also comprising a pair of girders 42, 43, which are held in parallel spaced relationship and braced by members 44, 45, 46, 47. Towards the end of the girders 31, 32 forming the slidable member is attached arcuate members 48, 49 respectively, each provided with a row of aligned holes 50, 51 respectively, and these members are braced by depending members 52, 53 also attached to the girders 31, 32 respectively. The arcuate rows of holes 50, 51 are intended to accommodate a long bolt-like member 54 such that the angular position of the pivoted arm formed by the members 42, 43 may be determined by allowing it to engage the bolt-like member 54 when located in one pair of the aligned holes 50, 51.

To facilitate the elevation of the pivoted arm to enable it to be adjusted into a position in which it may be located as just described, a winch 55 is provided at the remote end of the slidable member and the cable 56 of this winch passes over a pulley 57 at the adjacent end of the slidable member to terminate by engaging the bracing member 44 of the pivoted arm. The winch is rotated by means of a handle 58 which is desirably removable and only positioned when it is required to adjust the angle of the pivoted arm.

A pulley 59 having a square section aperture shown in Fig. 3a therethrough, is mounted for free rotation on a plate 60 carried by the fore-and-aft member 5 of the support and by the upright members 1 and 2 thereof, being shaped to allow the girders 31, 32 to pass therethrough. A square section shaft 61 extends slidably through the pulley 59 for rotation therewith and is supported at one end in a bearing 62 at the end of the slidable member, and towards its other end in a bearing 63 on a transverse intermediate member 64 extending across between the girders 31, 32 of the slidable member, which member and the square shaft 61 may slide with respect to the pulley 59.

The square section shaft 61 is connected through a universal coupling 65 to a drive shaft 66 which is supported in bearings 67, 68 carried by transverse plates extending across between the members 42, 43 forming the pivoted arm. The other end of the drive shaft 66 is connected through a universal coupling 69 to an auxiliary drive shaft 70 which is supported by bearings 71, 72 carried by a pair of members 73, 74 which are pivoted at 97 near the free ends of the members 42, 43 on an axis passing through the universal couplings 69 and forming a mounting which may be set at various angles to the pivoted arm. The members 42, 43 carry at their ends plates 75, 76 respectively in which are provided arcuate rows of holes 77, 78, in any one pair of which a bolt 98 may be placed against which the members 73, 74 will rest to determine the angularity of such members with respect to the pivoted arm members 42, 43.

The other end of the auxiliary drive shaft 70 is connected through a universal coupling 79 to a final drive shaft 80 which is supported by bearings in a mounting 81 which is arranged to pivot at 99 with respect to the members 73, 74 about an axis passing through the centre of the universal coupling 79. The angularity of the mounting 81 is similarly determined by means of plates 82, 83 carried at the free ends of the members 73, 74 and similarly having rows of arcuate holes 84, 85 respectively to accommodate a bolt 100. The free end of the final drive shaft 80 carries a disc cutter 86 which is provided with projecting cutting teeth 87, of which there may be six as illustrated, or a smaller or larger number. Due to the adjustment provided by the angularly adjustable mountings 73, 74 and 81 the plane of rotation of the cutter 86 may be varied between almost vertical to substantially horizontal.

A pulley 88, such as is provided on certain makes of tractors or specially provided to be driven from the power take-off point of the engine of the tractor 19, is connected by an endless driving belt 89 to the pulley 59. Thus on driving the pulley 88, the pulley 59 is rotated and by its engagement with the square section shaft 61 rotates the same to drive through the universal coupling 65 onto the drive shaft 66 through the universal coupling 69 to the auxiliary drive shaft 70 and so through the universal coupling 79 to the final drive shaft 80 to rotate the disc cutter 86. The direction of rotation of the disc cutter is clockwise as seen in Figure 2 conveniently at a speed of some 700 to 800 revolutions per minute.

Should the cutting teeth 87 come into contact with an obstruction, damage is avoided by some slipping of the endless driving belt 89, but a further safety measure may be incorporated, say in the drive shaft 66, by providing a shearable coupling 90 illustrated in Figure 5 and comprising a flange 91 on the one part of the shaft 66 and a further flange 92 on the other part thereof and bolts 93 holding the flanges against relative rotation such that should the shaft 66 be subjected to an excess load tending to twist the same, the bolts 93 will shear and so break the coupling thereby avoiding damage to the rest of the machine as it is a simple and inexpensive matter to renew the bolts 93.

In using the machine two men are employed, one driving the tractor as normally, and the other standing in front of him with his legs astride the steering column 94 of the tractor 19 with his hands on the hand wheel 36 to move the slidable member to and fro to keep the cutter 86 working on the hedge in spite of the necessity of driving the tractor at different distances therefrom.

Once the cutter 86 has been set to cut a hedge at a desired angle further adjustment whilst working on the same hedge is unnecessary, and the hedge may be cut at the rate of some four miles per hour which is a convenient speed for the tractor, during which the slashings or cut-off branches are thrown rearwardly and fall in heaps ready for easy removal.

I claim:

1. A hedge cutting machine comprising a support capable of being mounted on a power driven vehicle, a slidable elongated member mounted for lateral displacement in a horizontal plane with respect to said support under manual control, a drive shaft carried by said slidable member, an arm pivoted to said slidable member for adjustment into one of a plurality of possible angular positions, a drive shaft carried by said arm, a universal coupling connecting together said drive shafts, a mounting pivoted to the free end of said arm for controlled angular adjustment, a drive shaft carried by said mounting, a universal coupling joining said drive shaft of said mounting with said drive shaft of said arm, a disc with projecting cutting teeth on the end of said drive shaft of said mounting, and means for rotating said drive shaft of said slidable member from the engine of said vehicle.

2. A hedge cutting machine as claimed in claim 1, including a further mounting pivoted to said mounting pivoted to said arm, a drive shaft carried by said further mounting, a universal coupling connecting said drive shafts of said mountings, and means for determining the angle of said further mounting with respect to said mounting, said toothed disc being on the end of said drive shaft of said further mounting.

3. A hedge cutting machine as claimed in claim 1, in which said mounting is movable between a pair of plates carried by said arm and said plates have arcuate rows of registering holes in which an element is placed to determine the angularity of said mounting.

4. A hedge cutting machine as claimed in claim 1, in which said arm is movable between a pair of arcuate members carried by said slidable member and said members have registering holes in which an element is placed to determine the angularity of said arm with respect to said slidable member.

5. A hedge cutting machine as claimed in claim 1, in which said support carries a drum rotatable by a hand wheel, and a cable passing around said drum is connected at its ends to said slidable member to effect lateral displacement thereof when said hand wheel is turned.

6. A hedge cutting machine as claimed in claim 1, in which said slidable member carries at one end a winch from which a cable extends over a pulley at the other end of said slidable member to engage said arm.

7. A hedge cutting machine as claimed in claim 1, in which said support carries a rotatable pulley and said drive shaft of said slidable member extends slidably through said pulley for rotation therewith, and the drive from the vehicle engine is taken from a pulley rotated thereby through an endless belt to said pulley carried by said support.

8. A hedge cutting machine as claimed in claim 1, in which one of said drive shafts is formed as two parts which are flanged and joined together by shearable bolts which will break on occurrence of an excess load which might tend to twist said drive shaft.

9. A hedge cutting machine as claimed in claim 1, in which said support comprises a structural framework carrying spaced pairs of rollers which support and guide longitudinal members which are interconnected and braced to form said slidable member.

RICHARD RICHARDSON.

REFERENCES CITED

The following references are of record in the file of this patent:

UNITED STATES PATENTS

| Number | Name | Date |
| --- | --- | --- |
| 1,679,421 | Himler | Aug. 7, 1928 |
| 1,911,516 | Landing | May 30, 1933 |
| 1,953,394 | Clapper | Apr. 3, 1934 |
| 2,165,851 | Harman | July 11, 1939 |
| 2,411,623 | Jaques | Nov. 26, 1946 |

FOREIGN PATENTS

| Number | Country | Date |
| --- | --- | --- |
| 561,490 | Great Britain | Dec. 17, 1943 |